No. 841,296. PATENTED JAN. 15, 1907.
O. D. WOODRUFF.
BREAD MIXER AND KNEADER.
APPLICATION FILED DEC. 6, 1906.
2 SHEETS—SHEET 1.
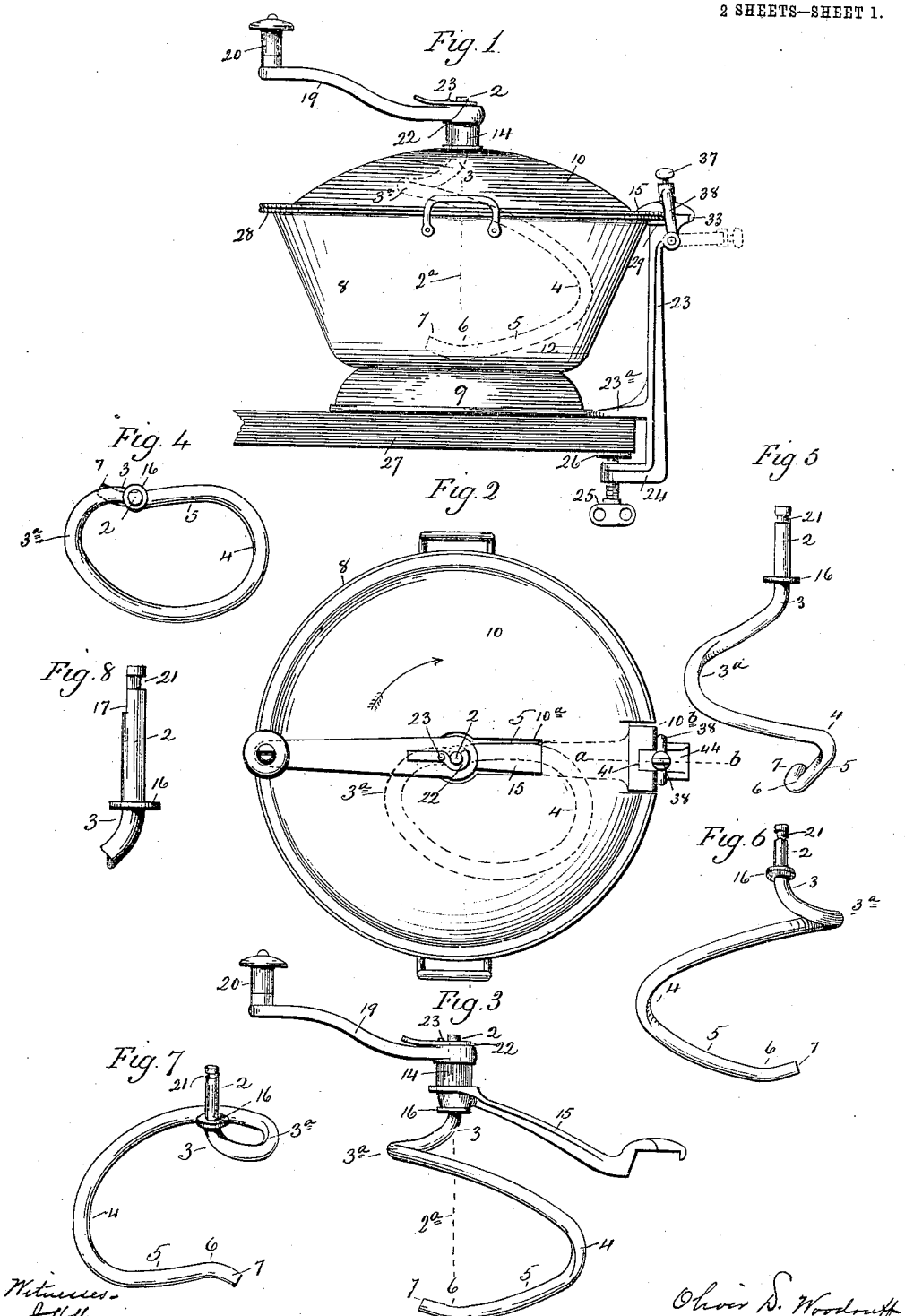

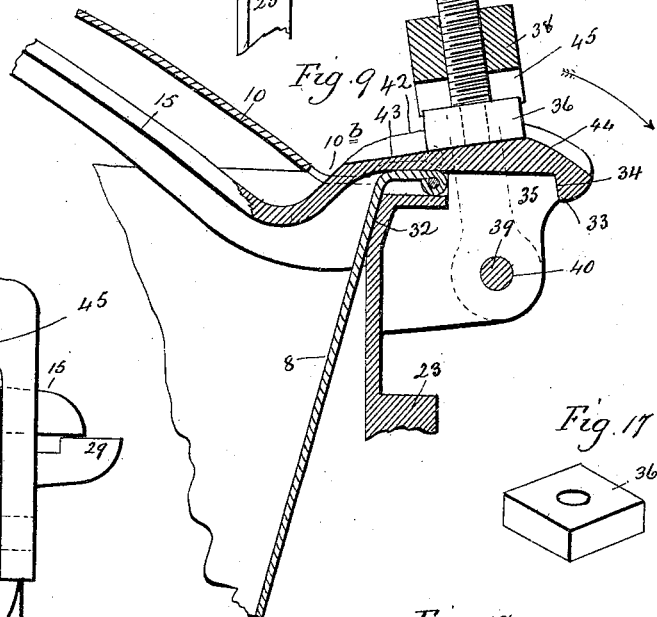

UNITED STATES PATENT OFFICE.

OLIVER D. WOODRUFF, OF SOUTHINGTON, CONNECTICUT.

BREAD MIXER AND KNEADER.

No. 841,296.　　　　　Specification of Letters Patent.　　　　　Patented Jan. 15, 1907.

Application filed December 6, 1906. Serial No. 346,603.

*To all whom it may concern:*

Be it known that I, OLIVER D. WOODRUFF, a citizen of the United States, residing at Southington, in the county of Hartford and State of Connecticut, have invented a new and useful Improvement in Bread Mixers and Kneaders; and I do hereby declare the following, when taken in connection with the accompanying drawings and the numerals of reference marked thereon, to be a full, clear, and exact description of the same, and which said drawings constitute part of this specification, and represent, in—

Figure 1, a view in side elevation of a bread mixer and kneader constructed in accordance with my invention shown applied to a table as in use; Fig. 2, a plan view thereof; Fig. 3, a detached view, in side elevation, of the carrier-arm, the kneading-rod, and the handle; Fig. 4, a detached plan view of the kneading-rod; Fig. 5, a detached view of the kneading-rod shown in elevation and turned a quarter-turn from right to left from the position in which it is shown in Figs. 1, 2, 3, and 4; Fig. 6, a detached perspective view of the rod tilted back and shown as turned a half-turn from right to left from the position in which it is shown in Figs. 1, 2, 3, and 4; Fig. 7, a perspective view of the rod turned in the same manner but tilted forward, so as to be looked down upon from above; Fig. 8, a broken view, on an enlarged scale, of the upper end of the rod; Fig. 9, an enlarged view, in broken vertical section, on the line *a b* of Fig. 2, showing the clamping-yoke in position to rigidly secure the carrier-arm to the bracket, at which time a portion of the edge of the flaring pan is also gripped between the carrier-arm and the bracket; Fig. 10, a broken view, in end elevation, on the same scale, showing the carrier-arm, the bracket, and the clamping-yoke, but not the pan; Fig. 11, a detached broken plan view of the outer end of the carrier-arm, showing its inwardly-inclined locking-face; Fig. 12, a corresponding view thereof in side elevation; Fig. 13, a corresponding reverse plan view thereof; Fig. 14, a view of the outer end thereof; Fig. 15, a detached plan view of the bracket, showing the clamping-yoke in its depressed or open position; Fig. 16, a broken view of the outer end of the bracket in side elevation, also showing the yoke in its open position; Fig. 17, a detached perspective view of the clamping-piece, which is swiveled upon the thumb-screw of the clamping-yoke; Fig. 18, another form the clamping-piece may assume.

My invention relates to an improvement in bread mixers and kneaders, the object being to produce a simple and effective mechanism for use in conjunction with an ordinary bread-pan and constructed with particular reference to being equally effective in mixing and kneading quantities of dough from the smallest "mess" up to the full capacity of the pan.

With these ends in view my invention consists in a bread mixer and kneader having the construction and combinations of parts to be hereinafter described, and pointed out in the claims.

In carrying out my invention I employ a helical rotor or kneading-rod made from a single piece of heavy rod and comprising, as shown, a straight journal 2, forming the upper terminal of the rod, an upper reach 3, extending outward and downward in a broad sweep from the lower end of the said journal and including a bend 3ª, a bend 4, even more open or on a larger circle than the bend 3ª aforesaid, a relatively straight lower reach 5, extending radially inward from the bend 4 and reaching the limit of its downward extension at a point 6 below or approximately below and axially in line with the said journal 2, and a dough-centering finger 7, bent slightly upward and outward from the point 6 and forming the lower terminal of the rod. This kneading-rod or helical rotor is located in the center of, and therefore coaxially, with an ordinary flaring bread-pan 8, which, as shown, has a foot 9 and a removable cover 10. It will be seen by reference to Figs. 1 and 2 that the nearest approach any portion of the rod makes to the pan is, as already stated, at the point 6, where the lower end of the reach 5 merges into the inner end of the dough-centering finger 7. I mention this to distinguish my rotor from rotors shaped to be parallel with the bottom or sides of a pan, or both, so as to exercise a scraping function.

My improved rotor has no scraping function, my object being to shape it so that from the smallest mess of dough that will ever be mixed up to the maximum capacity of the pan the dough will always be caught by either the upper or lower reach of the rod, or by both, and cut again and again as the rod is turned from left to right. The action of the rod is to constantly pile the dough up in the pan. The dough being unstable will lop over and be cut through by the rod.

In order to permit the dough to pile high and still be free to lop over, the rod is bent to secure the maximum open space between the lower end of its journal 2 and the point 6, this space being indicated by the broken line $2^a$. The bending of the finger 7 outward from the line of the lower reach contributes to the enlargement of this space, which also prevents the dough from "climbing" the rod. By making the lower bend 4 of the rod more open in its curvature than the bend $3^a$ the tendency of the rod to rotate the dough planetwise around the vertical axis of the rod is reduced. The object aimed at is, I may repeat, to pile up the dough, free it so as to let it lop over and then cut through it, pile it up again, let it lop over again, cut through it again, and so on. On the contrary, if the dough is rotated with the rod turn for turn it will not be kneaded. No work will be done. It will simply be idly revolved. Whether the dough lops over and is cut through at every turn of the rod or at every two or three or more turns thereof will depend upon the amount of dough being kneaded, its consistency, the speed at which the rod is turned, and so on. These conditions are of course variable. After the dough lops over the long upper reach 3 of the rotor rides over it like a sled-runner and holds it down, and the more it is held down when lopped over the more certain it will be cut through by the rod. The finger 7 assists in centering the dough at the bottom of the pan and prevents the dough from sliding off the rod when the dough is removed from the pan, from which it is "hooked out," as it were, by the rod when the same is removed therefrom. The inclination of the lower reach 5 forms a space 12 between it and the bottom of the pan. This space provides for enough adherence of the dough to the bottom of the pan to form a point of purchase for the rod to act against in cutting through it, while the inclination of the said lower reach as described prevents the dough, should the quantity be small, from riding over the same instead of being cut through thereby.

My improved rod may be mounted in a variety of ways. As herein shown, its journal 2 is passed upward through a vertical hub or sleeve 14, formed upon the inner end of a carrier-arm 15, curved in substantial accord with the curvature of the cover 10, which is cut away, as at $10^a$ and $10^b$, to fit over the said arm. The rod is provided at the lower end of its journal 2 with a washer 16, which engages with the lower end of the hub 14, while the upper end of the journal is flattened at 17 to adapt it to pass through a hole of corresponding flattened cross-section in the handle 19, which is furnished with a handle-grip 20.

By flattening the said journal and hole in this way the rod and handle are coupled for rotation together. That portion of the journal projecting upward through the said hole is formed with a circumferential locking-groove 21, receiving the edge of a hook-like locking-lever 22, secured to the upper face of the inner end of the handle by a pivot 23. The rod is very readily assembled with the carrier-arm 15 and handle 19 by simply inserting the journal 2 into the hub 14 and bringing the washer 16 to a bearing upon the lower face of the hub. The handle 19 is now applied to the projecting flattened end of the journal 2, after which the locking-lever 22 is swung into its locked position, in which its hook-like end enters the groove 21.

At its outer end the carrier-arm is rigidly clamped upon the upper end of a post-like bracket 23, furnished at its lower end with the usual means for securing such a bracket to the edge of a table, these means consisting of parallel arms $23^a$ and 24, of which the latter is furnished with a thumb-screw 25, carrying a clamping-washer 26, which is forced by the screw 25 against the lower face of the table-top 27. The bracket 23 is proportioned in height to the height of the pan 8, so that the rim 28 of the pan will hook over, as it were, and rest upon two horizontal bearing-faces 29 29 at the upper end of the bracket, the inner face of which is curved, as at 30, Fig. 15, to conform to the curvature of the rim of the pan. Now to clamp the edge of the pan 8 between the carrier-arm 15 and the bracket 23, as well as to clamp the carrier-arm upon the bracket, I form the carrier-arm at its outer end with two slightly-inclined clamping-faces 31, which engage with the inner face of the pan at a point just within the rim 28 thereof and force the opposite outer face of the pan against the slightly-inclined bearing-face 32 upon the inner face of the upper end of the bracket, whereby a portion of the pan is gripped and pinched between the carrier-arm and the bracket, as clearly shown in Fig. 9. These parts are drawn together by the provision of the extreme outer end of the carrier-arm with a hook 33, wide enough in its lateral extension to hook over the ends 34 34, Fig. 15, of a pair of complementary lugs 35, formed integral with the outer face of the upper end of the bracket. The outer end of the carrier-arm is drawn firmly down upon the horizontal upper edges of the said lugs 35, Fig. 9, by means of a rectangular clamping-piece 36, swiveled upon the lower end of a thumb-screw 37, mounted in the outer or bowed portion of a clamping-yoke 38, turning upon a heavy pivot 39, passing through holes 40 in the lugs 35. To adapt the carrier-arm 15 to coact with this yoke, and more particularly with its clamping-piece 36, the upper face of the arm is formed at its outer end with a groove 41, Fig. 11, a trifle wider than the clamping-piece 36, which is prevented from turning by engagement with the side walls 42 of the groove. The bottom of this groove forms an inwardly-inclined locking-face 43, which at its outer end merges into a rounded clearance-face 44. When the clamping-piece 36 is brought to a bearing upon the inclined locking-face 43, the yoke 38 will have assumed a position in which it is inclined inward from the vertical, as shown in Fig. 9. In this position it clamps the various parts mentioned securely together.

In order that the block 36 may always be properly presented to the groove 41 in the carrier-arm, the yoke is formed with a recess 45 for the reception of the piece, which is thus prevented from turning with the thumb-screw 37. The clamping-piece 36 therefore is always in position to be at once entered into the groove 41 for being swung over into position to be jammed down upon the inclined locking-face 43. If preferred, the clamping-piece may be made in the form of the thick washer 46. (Shown in Fig. 18.)

As already stated, my improved rod may be coaxially suspended over a bread-pan or corresponding receptacle by other means than those shown, and vice versa, the said means might be used to function a different rod. I do not, therefore, limit myself to their combination as shown.

I claim—

1. In a bread mixer and kneader, the combination with a flaring pan, of a kneading-rod arranged coaxially therein, and means for supporting the said rod which rod comprises a journal forming its upper terminal, an upper reach extending outwardly and downwardly from the lower end of the said journal and including a bend or curve, a lower reach extending inwardly and downwardly and terminating at its lower end at a point located below or approximately below and in axial line with the said journal and closer to the pan than any other point on the rod, and a bend connecting the lower end of the upper reach with the inclined upper end of the lower reach.

2. In a bread mixer and kneader, the combination with a flaring pan, of a kneading-rod arranged coaxially therein, and means for supporting the said rod which rod comprises a journal forming its upper terminal, an upper reach extending outwardly and downwardly from the lower end of the said journal and including a bend or curve, a lower reach extending inwardly and downwardly, and a bend connecting the upper reach with the lower reach and wider in curvature than the bend thereof.

3. In a bread mixer and kneader, the combination with a flaring pan, of a kneading-rod arranged coaxially therein, and means for supporting the said rod which comprises a journal, an upper reach extending outwardly and downwardly from the lower end of the said journal and including a bend or curve, a lower reach extending inwardly and downwardly and terminating at its lower end at a point located below or approximately below and in axial line with the said journal, a bend connecting the upper reach with the lower reach, and a dough-centering finger extending upwardly from the lower end of the lower reach and forming the lower terminal of the rod.

4. In a bread mixer and kneader, the combination with a flaring pan, of a kneading-rod arranged coaxially therein, and means for supporting the said rod which rod comprises a journal, an upper reach extending outwardly and downwardly from the lower end of the said journal and including a bend or curve, a lower reach extending inwardly and downwardly and terminating at its lower end at a point located below or approximately below and in axial line with the said journal, a bend connecting the lower end of the upper reach with the inclined upper end of the lower reach and more open in curvature than the bend or curve thereof, and a dough-centering finger forming the lower terminal of the rod and extending beyond the lower end of the lower reach.

5. In a bread mixer and kneader, the combination with the receptacle thereof, of a mixing and kneading instrumentality, a carrier-arm supporting the instrumentality coaxially in the receptacle and having its outer end formed with an inwardly-inclined locking-face, a bracket, a yoke pivotally mounted thereon, a thumb-screw mounted in the said yoke, and a clamping-piece carried by the thumb-screw and coacting with the locking-face, when the yoke is swung inward from the vertical, for rigidly securing the arm to the bracket.

6. In a bread mixer and kneader, the combination with the receptacle thereof, of a mixing and kneading instrumentality, a carrier-arm supporting the instrumentality coaxially in the receptacle and having its outer end formed upon its upper face with a groove containing an inwardly-inclined locking-face, a bracket adapted at its upper end to have the outer end of the said arm applied to it, a yoke pivoted to the bracket, a thumb-screw mounted in the yoke, and a clamping-piece carried by the thumb-screw and engaging with the locking-face, when the yoke is swung inwardly from the vertical, for rigidly securing the arm to the bracket.

In testimony whereof I have signed this specification in the presence of two subscribing witnesses.

OLIVER D. WOODRUFF.

Witnesses:
FREDERIC C. EARLE,
GEORGE D. SEYMOUR.